United States Patent [19]

Su

[11] 4,441,682

[45] Apr. 10, 1984

[54] REAR VIEW MIRROR LOCKING MECHANISM

[76] Inventor: Fu-Chu Su, No. 2-39 Yeng Hang Tsun, Yang Kang Hsiang, Tainan, Taiwan

[21] Appl. No.: 287,232

[22] Filed: Jul. 27, 1981

[51] Int. Cl.³ .............................................. A47G 1/24
[52] U.S. Cl. ................................ 248/475.1; 248/476
[58] Field of Search ................ 248/475 R, 476, 231.5; 224/331, 329; 24/201 LP

[56] References Cited

U.S. PATENT DOCUMENTS 3,015,897 1/1962 Hopp .............................. 248/231.5 X
3,857,539 12/1974 Kavanaugh ...................... 248/475 R
4,073,461 2/1978 Lopez et al. ..................... 248/475 R
4,187,702 2/1980 Benton ......................... 248/475 R X Primary Examiner—Ramon S. Britts
Assistant Examiner—Sarah A. Lechok
Attorney, Agent, or Firm—Brumbaugh, Graves, Donohue & Raymond

[57] ABSTRACT

A rear-view-mirror locking mechanism for a car comprises a longitudinal arm for holding the mirror and a U-shaped supporting bar coupled with said longitudinal arm through a locking screw and two spacing plates thereof. By turning the screw to abut tightly against the surface of the longitudinal arm, the supporting bar and the longitudinal arm are locked in a fixed position, secured at the fender of the car thus holding the mirror firmly.

1 Claim, 3 Drawing Figures

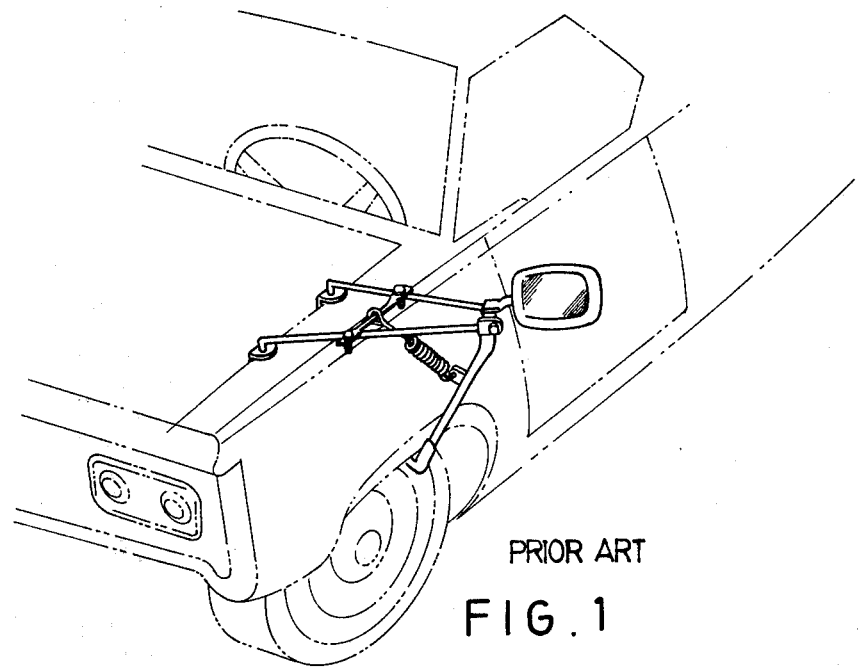
PRIOR ART
FIG. 1
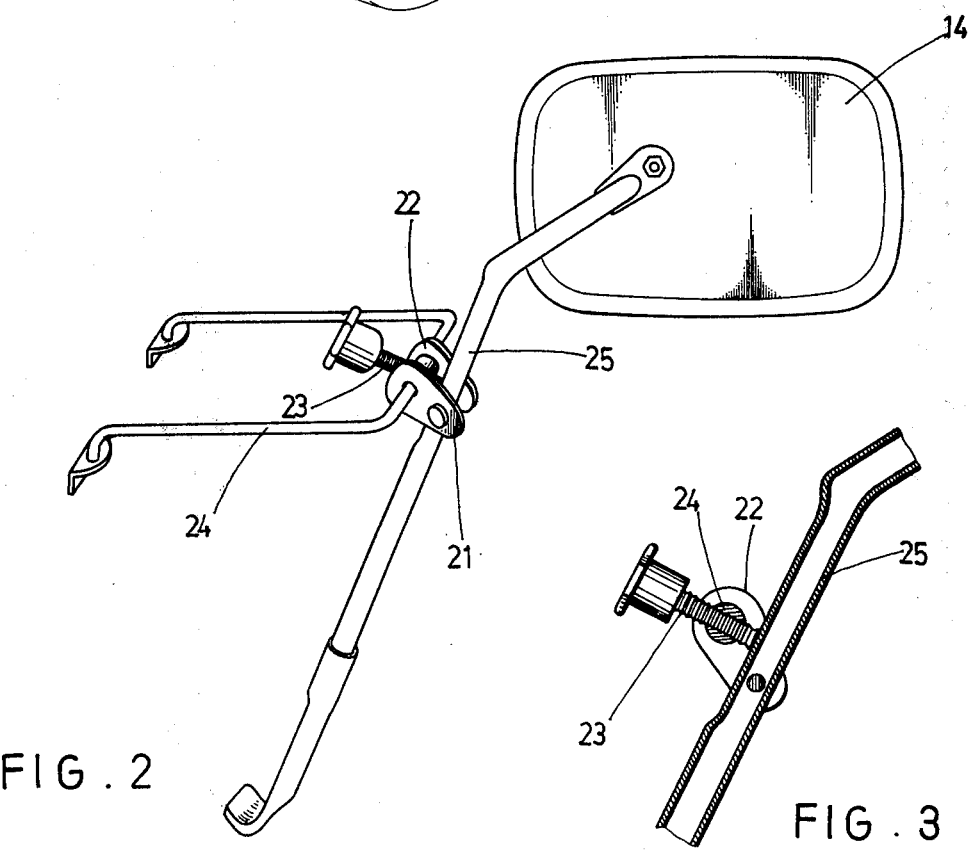
FIG. 2
FIG. 3

REAR VIEW MIRROR LOCKING MECHANISM

BACKGROUND OF THE INVENTION

This invention relates to a rear-view-mirror locking mechanism particularly to a movable rear view mirror locking mechanism.

In common practice, a rear view mirror is either fixedly positioned at the front fender of a vehicle or held movably by a locking mechanism thereat as shown in FIG. 1. The fixedly positioned rear view mirror can only provide a limited adjustment for the mirror and sometimes present a narrow view for the driver. In the second case, the mirror can provide a broader view as the locking mechanism can be removed from the car body and fixed at any desired position. But it has the following defects: (1) the locking action is easily effected by an external force due to the elastic property of the spring, causing the mirror to be unstable and the image unclear; (2) in case the longitudinal bar fails to hook up at the fender when stretching out the spring, it will cause scratches to the surface of the fender when the spring contracts; and (3) a great force has to be applied to stretch out the spring for locking the supporting bars thereof.

The above defects have been improved by a simple construction of this invention wherein the locking mechanism can be fixed at any desired position and the supports of the rear view mirror can be firmly secured thereat.

SUMMARY OF THE INVENTION

According to the invention, a rear-view-mirror locking mechanism for car includes a longitudinal arm and a U-shaped supporting bar coupled with said longitudinal arm through a locking screw and two spacing plates. The locking screw is threadedly connected through said supporting bar with the screw end abutting against the surface of said mirror arm. Both of said mirror arm and said supporting bar have a curved end for being attached to the fender of a car. By turning said locking screw to tight, the curved ends of said mirror arm and said supporting bar will be firmly secured against the fender of a car.

The primary object of the invention is to provide a simple and movable rear-view-mirror locking meachanism for adjusting the rear-view-mirror to a desired position.

Another object of the invention is to provide a rear-view-mirror locking mechanism with a strong locking screw for firmly holding the rear view mirror in position without being subject to external influence.

These and other objects, advantages and features of the present invention will become apparent from the following detailed description of the preferred embodiment with reference to the accompanying drawings in which:

BRIEF DESCRIPTION OF THE DRAWINGS

FIG. 1 is a perspective view of a rear-view-mirror locking mechanism in the prior art, FIG. 2 is a perspective view of a rear-view-mirror locking mechanism embodying the present invention, and FIG. 3 is a partial sectional view of FIG. 1 illustrating a locking screw being threadedly connected through a supporting bar with the screw end abutting against the surface of a mirror arm.

DETAILED DESCRIPTION OF THE PREFERRED EMBODIMENT

As shown in FIGS. 1 and 2, the locking mechanism of the invention comprises a U-shaped supporting bar 24 having two hooked ends for hooking up at the upper edge of the fender of a car and a longitudinal arm 25, holding a mirror 14, having a hooked end for hooking up at the lower edge of the fender above the front wheel. Two spacing plates 21 and 22 are parallelly pivoted at the intermediate portion of the longitudinal arm 25 and a U-shaped supporting bar 24, and a locking screw 23 is transversely passing the supporting bar 24 between the plates 21 and 22 through a threaded hole therein.

When installing the locking mechanism on the fender, firstly turn the locking screw 23 to loose, and set the U-shaped supporting bar 24 and the longitudinal arm 25, respectively, to hook up the upper edge and lower edge of the fender, and then, by turning the screw 23 to abut tightly against the surface of the longitudinal arm 25 will be firmly secured against the fender. In this way the rear view mirror is firmly supported. In view of the above-described mechanism, it is apparent that the invention is simpler and has stronger locking ability than the conventional one.

With the invention thus explained, it is apparent that any improvements and modifications may be made without departing from the spirit of the present invention. It is intended that the scope of the present invention is defined merely by the appending claims.

I claim:

1. A rear-view-mirror locking mechanism for a car comprising:
    a longitudinal arm having one end curved and the other end holding a mirror;
    a U-shaped supporting bar defined by a pair of elongate sections joined by a middle portion, each of said elongate sections having a curved end for being removably attached to the fender of a car and a threaded opening in said middle portion;
    a pair of parallel plates each of which has one end pivoted to said longitudinal arm and the other end having aperture means therein receiving said middle portion of said supporting bar, said parallel plates positioned on either side of said threaded opening; and
    a locking screw threadedly connected through said threaded opening and disposed between said two parallel plates with the screw end abutting against the surface of said longitudinal arm whereby this locking mechanism can be placed at any desired position along the front fender of the car and the curved ends of said longitudinal arm and said U-shaped supporting bar will be firmly secured against the fender edge of the car by turning said locking screw to abut tightly against the surface of said longitudinal arm.

* * * * *